(12) United States Patent
Lindoff et al.

(10) Patent No.: US 9,351,243 B2
(45) Date of Patent: May 24, 2016

(54) METHOD AND ARRANGEMENT FOR A TERMINAL OF A WIRELESS COMMUNICATION NETWORK

(75) Inventors: Bengt Lindoff, Bjärred (SE);
Muhammad Kazmi, Bromma (SE);
Ylva Jading, Stockholm (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 973 days.

(21) Appl. No.: 13/515,301

(22) PCT Filed: Nov. 26, 2010

(86) PCT No.: PCT/EP2010/068300
§ 371 (c)(1),
(2), (4) Date: Aug. 16, 2012

(87) PCT Pub. No.: WO2011/076517
PCT Pub. Date: Jun. 30, 2011

(65) Prior Publication Data
US 2012/0307699 A1 Dec. 6, 2012

Related U.S. Application Data

(60) Provisional application No. 61/297,983, filed on Jan. 25, 2010.

(51) Int. Cl.
*H04W 52/02* (2009.01)
(52) U.S. Cl.
CPC ...... *H04W 52/0206* (2013.01); *H04W 52/0251* (2013.01)
(58) Field of Classification Search
CPC .................................................. H04W 52/0206
See application file for complete search history.

(56) References Cited

U.S. PATENT DOCUMENTS

| | | | |
|---|---|---|---|
| 7,043,257 B2 * | 5/2006 | Nohara | G01S 5/0221 370/386 |
| 2002/0031105 A1 * | 3/2002 | Zeira | H04B 1/69 370/337 |

(Continued)

FOREIGN PATENT DOCUMENTS

| | | |
|---|---|---|
| EP | 2 056 628 A1 | 5/2009 |
| WO | 02/07464 A1 | 1/2002 |

OTHER PUBLICATIONS

Wengerter et al ("Configuration of Control Channels in a Mobile Communications System" published Jul. 17 2008).*

(Continued)

*Primary Examiner* — Raj Jain
*Assistant Examiner* — Jamaal Henson
(74) *Attorney, Agent, or Firm* — Leffler Intellectual Property Law, PLLC

(57) ABSTRACT

Wireless communication network terminal operation is disclosed. The network comprises wireless network nodes having first and second downlink transmission modes. The first mode involves normal operation of a particular network node and is applicable when a number of active terminals in a cell associated with the particular network node is greater than a first mode threshold value. The second mode involves restricted downlink transmission of the particular network node and is applicable when the number of active terminals in the cell associated with the particular network node is not greater than a second mode threshold value. A cell identity is detected for a cell associated with a wireless network node of the wireless communication system. A current downlink transmission mode of the node is detected as the first or second downlink transmission mode, and an operation of the terminal is adapted based on the detected current downlink transmission mode.

17 Claims, 2 Drawing Sheets

(56) References Cited

U.S. PATENT DOCUMENTS

| | | | |
|---|---|---|---|
| 2007/0032225 A1* | 2/2007 | Konicek | H04M 1/72513 |
| | | | 455/417 |
| 2007/0109956 A1* | 5/2007 | Kwon | H04L 1/0003 |
| | | | 370/208 |
| 2008/0151797 A1 | 6/2008 | Camp, Jr. | |
| 2009/0290561 A1 | 11/2009 | Kleindl | |
| 2012/0188962 A1* | 7/2012 | Gao | H04B 7/0434 |
| | | | 370/329 |

OTHER PUBLICATIONS

3rd Generation Partnership Project (Technical Specification Group Radio Access Network; Evolved Universal Terrestrial Radio Access (E-UTRA) and Evolved Universal Terrestrial Radio Access Network (E UTRAN); Overall description; Stage 2 (Release 11 Document No. TS 36.300 published Dec. 2011); 3GPP 36.300.*

3rd Generation Partnership Project (Technical Specification Group Radio Access Network; Evolved Universal Terrestrial Radio Access (E-UTRA); Physical layer procedures (Release 10) Version 10.4.0 Document No. TS 36.213 published Dec. 2011; 3GPP 36.213).*

3rd Generation Partnership Project ("Technical Specification Group Radio Access Network; Evolved Universal Terrestrial Radio Access (E-UTRA) Radio Resource Control (RRC); Protocol specification (Release 8)" TS 36.331 v 8.7.0 published Sep. 2009; hereinafter 3GPP 36.331.*

3rd Generation Partnership Project (Technical Specification Group Radio Access Network; Evolved Universal Terrestrial Radio Access (E-UTRA); Base Station (BS) radio transmission and reception (Release 8) TS 36.104 published May 2009; herein after 3GPP 36.104).*

Rappaport ("Wireless Communications—Principles and Practice" p. 424-435, published 1996).*

3rd Generation Partnership Project (Technical Specification Group Radio Access Network; Evolved Universal Terrestrial Radio Access (E-UTRA); Physical layer procedures (Release 8) Version 8.6.0 Document No. TS 36.213 published Mar. 2009.*

3rd Generation Partnership Project ("Technical Specification Group Radio Access Network; Evolved Universal Terrestrial Radio Access (E-UTRA) Radio Resource Control (RRC); Protocol specification (Release 8)" TS 36.331 v 8.7.0 published Sep. 2009.*

3rd Generation Partnership Project (Technical Specification Group Radio Access Network; Evolved Universal Terrestrial Radio Access (E-UTRA); Base Station (BS) radio transmission and reception (Release 8) TS 36.104 published May 2009.*

PCT International Search Report, mailed Jan. 18, 2011, in connection with International Application No. PCT/EP2010/068300.

3GPP TS 36.133, V9.1.0 Technical Specification Group Radio Access Network; Evolved Universal Terrestrial Radio Access (E-UTRA); Requirements for support of radio resource management (Release 9), Sep. 2009.

3GPP TS 36.214, V9.0.0 Technical Specification Group Radio Access Network; Evolved Universal Terrestrial Radio Access (E-UTRA); Physical layer—Measurements (Release 9), Dec. 2009.

3GPP TS 36.331, V9.0.0 Technical Specification Group Radio Access Network; Evolved Universal Terrestrial Radio Access (E-UTRA) Radio Resource Control (RRC); Protocol specification (Release 9), Sep. 2009.

PCT International Preliminary Report on Patentability, mailed Jul. 5, 2012, in connection with International Application No. PCT/EP2010/068300.

* cited by examiner

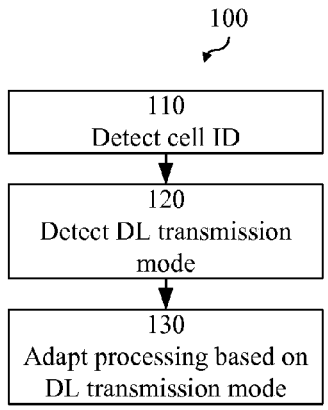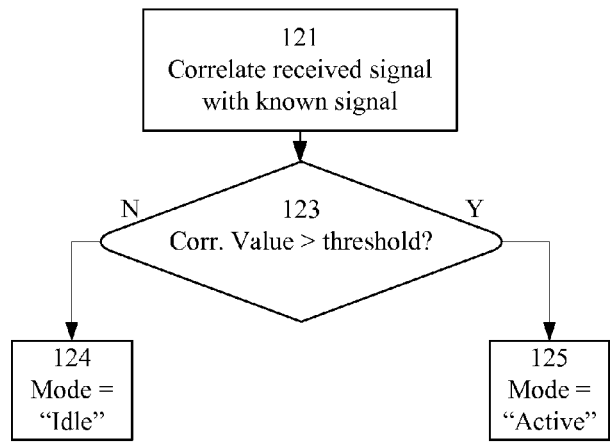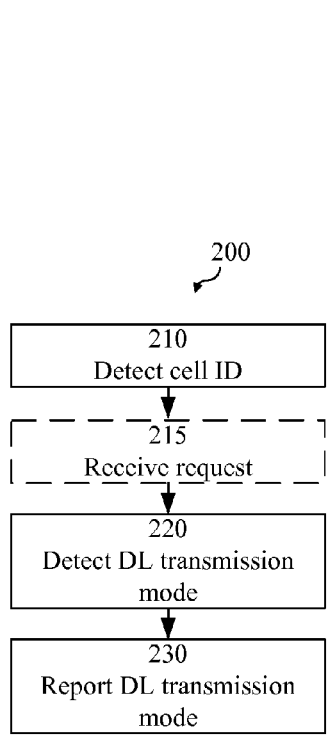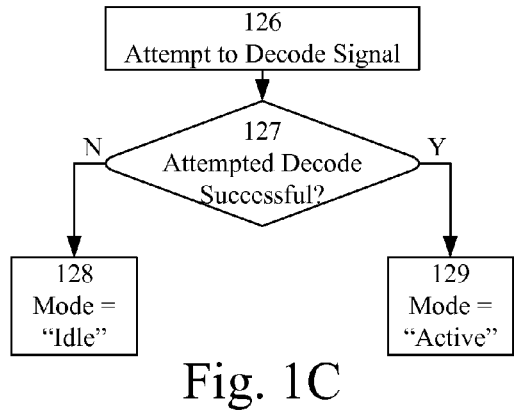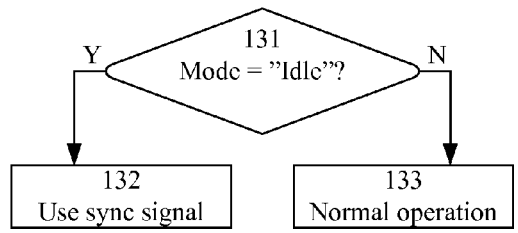

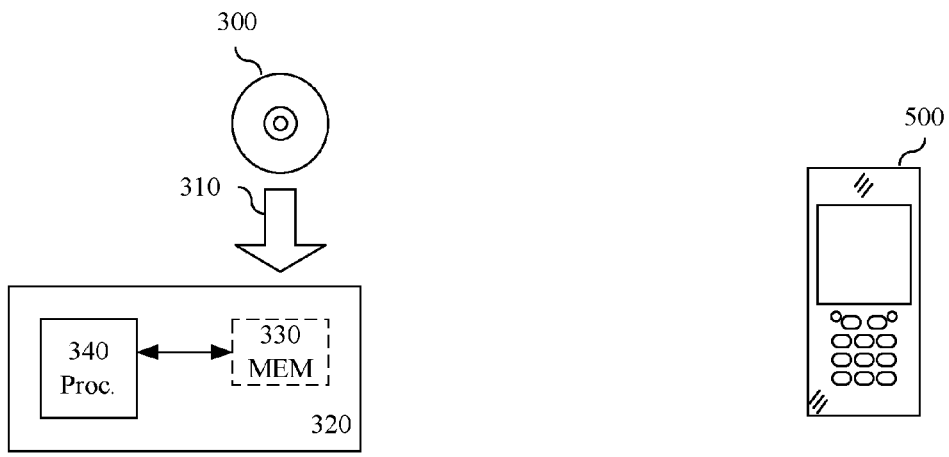
Fig. 3
Fig. 5
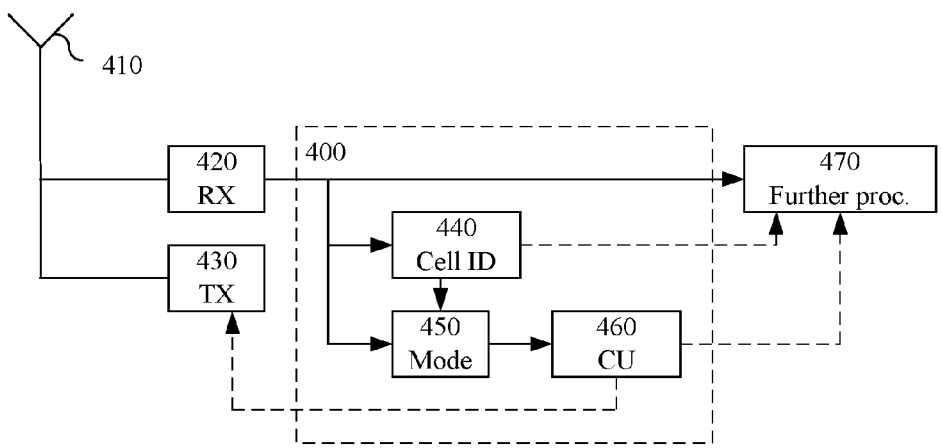
Fig. 4A
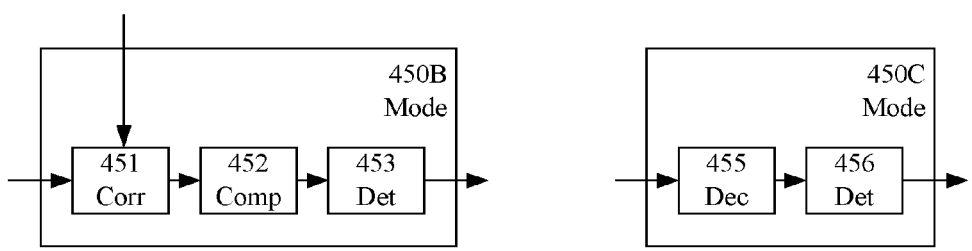
Fig. 4B
Fig. 4C

METHOD AND ARRANGEMENT FOR A TERMINAL OF A WIRELESS COMMUNICATION NETWORK

CROSS-REFERENCE TO RELATED APPLICATIONS

This application claims priority under 35 U.S.C. §119 to European Patent Application No. 09180300.7, filed Dec. 22, 2009, which is hereby incorporated herein by reference in its entirety. This application also claims the benefit of U.S. Provisional Application No. 61/297,983, filed Jan. 25, 2010, which is hereby incorporated herein by reference in its entirety.

TECHNICAL FIELD

The present invention relates generally to the field of operating terminals in a wireless communication network having network nodes with two operation modes, such as a high activity mode and a low activity mode.

BACKGROUND

Energy consumption has always been and still is an important issue for mobile terminals of wireless communication systems such as cellular systems. Recently, trends in environmental friendly technology make it important to reduce the energy consumption also for the network nodes (e.g. base stations—BS, NodeB, eNodeB, etc). Unlike terminals, which have possibilities to go into idle (or sleep) mode once they are not active, a network node needs to always transmit some signals (e.g. pilots, synchronization symbols and broadcast messages) so that camping terminals may stay in synchronization (in sync) with the network.

In an example scenario, when a network node serves a cell with many active terminals and some idle terminals, the network node may need to continuously transmit pilots, synchronization signals, etc, in order to maintain connection to the terminals. However, in an alternative scenario, when a network node serves a cell where all terminals are in an idle state (or in an active state with very low activity), the situation is somewhat different. In such scenarios, the terminals do not receive any data (or only a very small amount of data). The terminals only need to do mobility measurements (such as measurements for cell reselection or handover) and listen to paging messages. In such scenarios, a network node which is transmitting according to its conventional transmission scheme will waste a lot of energy.

Proposals considering an ability to put network nodes with a low load (e.g. serving no or few active terminals) into an "idle" state have been discussed.

An "idle" state (or energy saving mode) of a network node may be applicable when there are no active terminals in a cell associated with the network node. Alternatively or additionally, the "idle" state of a network node may be applicable when the number of active terminals in the cell are less than or equal to a threshold.

In the same manner a normal operation mode of a network node may be applicable when there is at least one active terminal in a cell associated with the network node. Alternatively or additionally, the normal operation mode may be applicable when the number of active terminals in the cell is greater than a threshold (which may or may not be the same as the threshold for the "idle" state).

Generally, the "idle" state may comprise restricted downlink transmissions. For example, some signals may be transmitted intermittently instead of continuously, and/or some signals may be transmitted using only part of the cell transmission bandwidth, and/or some signals may not be transmitted at all.

An example of a network node "idle" state may be a low activity mode of the network node comprising restricted or reduced downlink transmissions. One possible approach might be to reduce the amount of transmitted signals or channels to an absolute minimum. There are numerous possible ways to achieve a low activity mode of a network node, and the possibilities may vary depending on the access technology under consideration. Definitions and particulars of a network node "idle" state may be specified in standardization documentation for the applicable standards. Low activity state, low transmission state, restricted state, and restricted transmission state are other examples of possible terminologies that may be used for the idle state. The skilled person recognizes that all of these terms may have similar or the same meaning. Hereinafter, the terms idle state, energy saving mode and low activity mode will be used. A few examples of approaches that are applicable to UMTS LTE (Universal Mobile Telecommunication Standard Long Term Evolution, Release 9, 10 and onwards; E-UTRAN—Evolved UMTS Terrestrial Radio Access Network) are given in the following. It should be noted however, that these are merely examples and by no way limiting to the invention.

In UMTS LTE it may be sufficient for a NodeB in the "idle" state to transmit only synchronization signals (PSS—Primary Synchronization Sequence/SSS—Secondary Synchronization Sequence) and physical broadcast information (P-BCH—Physical Broadcast CHannel) together with pilot symbols (also denoted reference signals and used for e.g. channel estimation) in association with the P-BCH transmission. These signals are transmitted in well defined OFDM symbols in sub-frames 0 and 5 in both FDD (Frequency Division Duplex) and TDD (Time Division Duplex). If such an approach is used, the NodeB can reduce its duty cycle significantly and basically transmit information only in a few OFDM symbols of the sub-frames 0 and 5.

If more limited pilot (or reference) signals are transmitted in the energy saving mode (e.g. only in sub-frames 0 and 5, and only over 6 central resource blocks, then a terminal may perform measurements over a smaller bandwidth than when the network node is in non-energy saving mode.

In another approach that further reduces the amount of transmissions in UMTS LTE, only the synchronization signals (PSS/SSS) are transmitted by the network node when it is in the "idle" state. As in the previous example above these signals are transmitted in sub-frames 0 and 5. The transmission takes place over 6 central resource blocks regardless of the actual cell transmission bandwidth (i.e. the bandwidth in the active state).

A problem that arises when reducing the number of pilots is that the terminal needs to rely on fewer symbols for keeping in sync with the network node.

Another problem that arises is that the operations of a terminal (e.g. measurements, paging listening, etc) designed to work well when the corresponding network node is in a normal operation mode may not be optimal when the corresponding network node is in the "idle" state.

Thus, there is a need for methods and arrangements for operating a terminal in a wireless communication network having network nodes with two operational modes, e.g. a high activity mode (conventional operation) and a low activity mode ("idle" state).

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide methods and arrangements for operating a terminal in a wireless communication network having network nodes with two operational modes.

The two operational modes may be operable to set the entire network node operation into a high activity operational mode or a low activity operational mode. It should be noted, however, that the two operational modes may alternatively or additionally be applicable on cell level (in the case when a network node serves several cells) and/or on carrier level (in the case when a network node or cell applies more than one carriers). Thus, to give an example, the same network node may simultaneously serve one of its cells in a low activity mode and another one of its cells in high activity mode.

According to a first aspect of the invention, this is achieved by a method of operating a terminal of a wireless communication network, wherein the wireless communication network comprises one or more wireless network nodes having at least first and second downlink transmission modes. The first downlink transmission mode comprises normal operation of a particular network node and is applicable when a number of active terminals in a cell associated with the particular network node is greater than a first mode threshold value. The second downlink transmission mode comprises restricted downlink transmission of the particular network node and is applicable when the number of active terminals in the cell associated with the particular network node is less than or equal to a second mode threshold value. The restricted downlink transmission comprises information that assists active terminals not served by the cell in finding the cell and/or non-active terminals camping on the cell to stay in synchronization with the wireless communication network. The method comprises detecting a cell identity for a cell associated with a wireless network node of the wireless communication system, detecting a current downlink transmission mode of the wireless network node as the first or second downlink transmission mode, and adapting a further operation of the terminal based on the detected current downlink transmission mode.

In some embodiments, the step of detecting a current downlink transmission mode may comprise using blind detection of the current downlink transmission mode.

The blind detection of the current downlink transmission mode may comprise correlating a received signal with a specific signal pattern that is transmitted by the wireless network node only when the wireless network node is operating in the first downlink transmission mode, and determining whether the wireless network node operates in the first or second downlink transmission mode based on the correlation step.

The step of determining whether the wireless network node operates in the first or second downlink transmission mode based on the correlation step may, in some embodiments, comprise comparing a mode determination value with a correlation threshold value, wherein the mode determination value is based on one or more correlation values of the correlation step, determining that the wireless network node operates in the first downlink transmission mode if the mode determination value exceeds the correlation threshold value, and determining that the wireless network node operates in the second downlink transmission mode if the mode determination value does not exceed the correlation threshold value.

The blind detection of the current downlink transmission mode may comprise making an attempt to decode specific broadcast information of a received signal, wherein the specific broadcast information is transmitted by the wireless network node only when the wireless network node is operating in the first downlink transmission mode, determining that the wireless network node operates in the first downlink transmission mode if the attempt is successful, and determining that the wireless network node operates in the second downlink transmission mode if the attempt is not successful.

In some embodiments, the method may further comprise receiving a request from the wireless communication network to detect the current downlink transmission mode and report the detected current downlink transmission mode to the network node, and reporting the detected current downlink transmission mode to the network node.

The second operation mode may comprise transmission of a synchronization signal and the step of adapting the further operation of the terminal based on the detected current downlink transmission mode may comprise—if the current downlink transmission mode is the second downlink transmission mode—using the synchronization signal for at least one of: monitoring a quality of a downlink radio link, automatic frequency control, mobility measurements, positioning measurements for determination of terminal location, time synchronization, and frequency synchronization.

In some embodiments, the second operation mode may comprise intermittent downlink transmission of the particular network node.

The first and/or second mode threshold value may equal zero according to some embodiments.

A second aspect of the invention is a computer program product comprising a computer readable medium, having thereon a computer program comprising program instructions, the computer program being loadable into a data-processing unit and adapted to cause the data-processing unit to execute method steps according to the first aspect of the invention when the computer program is run by the data-processing unit.

A third aspect of the invention is an arrangement for a terminal of a wireless communication network, wherein the wireless communication network comprises one or more wireless network nodes having at least first and second downlink transmission modes. The first downlink transmission mode comprises normal operation of a particular network node and is applicable when a number of active terminals in a cell associated with the particular network node is greater than a first mode threshold value. The second downlink transmission mode comprises restricted downlink transmission of the particular network node and is applicable when the number of active terminals in the cell associated with the particular network node is less than or equal to a second mode threshold value, the restricted downlink transmission comprising information that assists active terminals not served by the cell in finding the cell and/or non-active terminals camping on the cell to stay in synchronization with the wireless communication network. The arrangement comprises a cell identity detector arranged to detect a cell identity for a cell associated with a wireless network node of the wireless communication system, a transmission mode detector arranged to detect a current downlink transmission mode of the wireless network node as the first or second downlink transmission mode, and a controller arranged to adapt a further operation of the terminal based on the detected current downlink transmission mode.

A fourth aspect of the invention is a communication device comprising the arrangement according the third aspect of the invention.

In some embodiments, the second, third and fourth aspects of the invention may additionally have features identical with or corresponding to any of the various features as explained above for the first aspect of the invention.

An advantage of some embodiments of the invention is that the terminal may adapt its operations to the current operational mode of the network node. For example, the terminal may adapt one or more of its time/frequency synchronization, its channel estimation algorithms, and its measurement algorithms relating to cell reselection, handover and/or radio link monitoring based on the current operational mode of the network node.

Another advantage of some embodiments of the invention is that the terminal behavior (in terms of robustness, performance and/or power consumption) may be improved.

Another advantage of some embodiments of the invention is that the terminal can determine the current operational mode of the network node.

Another advantage of some embodiments of the invention is that means are provided for the network to collect statistics of the operational modes of the cells/nodes based on terminal reports. Such statistics may, for example, be used for network planning and SON (Self Optimized Networks) functions.

BRIEF DESCRIPTION OF THE DRAWINGS

Further objects, features and advantages of the invention will appear from the following detailed description of embodiments of the invention, with reference being made to the accompanying drawings, in which:

FIGS. 1A-D are flowcharts illustrating example method steps according to some embodiments of the invention;

FIG. 2 is a flowchart illustrating example method steps according to some embodiments of the invention;

FIG. 3 is a schematic diagram illustrating a computer program product according to some embodiments of the invention;

FIGS. 4A-C are block diagrams illustrating example arrangements according to some embodiments of the invention; and FIG. 5 is a schematic drawing illustrating a mobile terminal which may comprise an arrangement according to some embodiments of the invention.

DETAILED DESCRIPTION

In the following, embodiments of the invention will be described where a terminal detects a current operational mode of a network node and adapts its operation based on the determination.

The description of embodiments of the invention will focus on UMTS LTE: However, it is to be understood that the invention is not limited to application is such systems. Furthermore, the term NodeB is used in the description, but this is in no way to be construed as limiting. Contrarily, embodiments of the invention are equally applicable in the context of any type of network node, such as any base station (eNodeB, femto cell, home base station, home eNodeB, home NodeB) or any radio network node having base station functionalities and capabilities.

First, a general description of example network signaling and some example tasks that may need to be performed by a terminal (or is desirable that a terminal performs) in a wireless communication network is given.

In order for a terminal to detect a cell and keep itself in synchronization with the network, a number of physical signals typically need to be transmitted by the network. In general, the terminal needs some type of synchronization signal(s) to synchronize itself with the system (e.g. P-SCH (Primary Synchronization CHannel) termed PSS (Primary Synchronization Sequence) and S-SCH (Secondary Synchronization CHannel) termed SSS (Secondary Synchronization Sequence) in UMTS and UMTS LTE).

Furthermore, some kind of reference symbols or pilot signals are typically required (e.g. CPICH (Common PIlot CHannel) in UMTS and RS (Reference Symbols) in UMTS LTE). These signals may be used to measure the signal strength and/or signal quality of a cell. They may also be used to estimate the radio channel used for data demodulation. In UMTS LTE FDD, RS typically used for measurements are transmitted in sub-frames 0, 4, 5, 9, from antenna port 0, and in the central 6 resource blocks.

The cell might also need to transmit broadcast information in order for a terminal to know various parameters (e.g. needed for setting up a connection). Depending on the cellular system, such information is transmitted on different physical channels. In UMTS LTE, broadcast information is sent via the physical broadcast channel (PBCH) and the physical downlink shared channel (PDSCH). The PBCH is transmitted in sub-frame 0 and contains the master information block (MIB), which carries important information such as cell bandwidth, one or more antenna ports, system frame number (SFN), etc. Other, more detailed, information may be transmitted via one or more of several system information blocks (SIB), which are mapped on PDSCH and transmitted in sub-frame 5 in UMTS LTE. In UMTS, there is only one broadcast channel, which contains both MIB and SIBs.

Thus, in UMTS LTE, the PSS/SSS and the broadcast channel (BCH) are used for the above purposes. It is noted, however, that some carriers may carry PSS/SSS but no BCH. It is also noted that other systems may employ other setups.

Information like the one described above (synchronization signals, reference signal, broadcast information) are commonly denoted Necessary Cell Identity Information (NCII), and is an example of information that may be transmitted by a network node in energy saving mode.

One example task to be performed by a terminal is performing mobility measurements. Depending on the current mode of the terminal, the terminal may perform any of two types of mobility, namely idle mode mobility (e.g. for cell reselection purposes) or connected mode mobility (e.g. for handover purposes).

In most applications, the cell reselection is a mainly terminal autonomous function without any direct intervention of the network. However, the terminal behaviour in this mobility scenario could—to some extent—be controlled by broadcasted system parameters and by performance specification. The handover, on the other hand, is in general fully controlled by the network through explicit terminal specific commands and by performance specification.

For both idle mode and connected mode, mobility decisions may mainly be based on downlink neighbor cell measurements (which may be of the same or different type for the two terminal operational modes).

For example, in UMTS LTE (E-UTRAN—Evolved UMTS Terrestrial Radio Access Network) the following downlink neighbor cell measurements (measured for serving and neighboring cells) are specified primarily for mobility purpose (see the specification document 3GPP TS 36.214, "Evolved Universal Terrestrial Radio Access (E UTRA); Physical layer measurements"):

Reference symbol received power (RSRP), which is signal strength measurement, and
  Reference symbol received quality (RSRQ), which is signal quality measurement (RSRQ=RSRP/carrier RSSI (Received Signal Strength Indication)).

Another example task for the terminal concerns radio link monitoring. In general, the radio link monitoring (RLM) procedure enables the terminal to detect whether it is out of sync or in sync with the serving cell.

The procedure may be used when the terminal is in RRC (Radio Resource Control) connected mode. In UMTS LTE, the RLM procedure and the corresponding requirements are specified in the specification documents 3GPP TS 36.331, "Evolved Universal Terrestrial Radio Access (E UTRA); Radio Resource Control (RRC); Protocol specification" and 3GPP TS 36.133, "Evolved Universal Terrestrial Radio Access (E UTRA); Requirements for support of radio resource management".

In some applications of UMTS LTE, the terminal measures the serving cell downlink quality based on a common reference signal to determine whether it is out of sync or in sync with the serving cell. After N successive out of sync determinations have been registered (where N is a network configured parameter), a radio link failure (RLF) procedure may be initiated. Upon completion of the RLF procedure, the terminal typically turns off its transmitter and may attempt to establish (or re-establish) a connection to the most suitable cell (e.g. the cell with the strongest measured signal).

Another example task for the terminal concerns Self Organizing Network (SON). Advanced technologies, such as E-UTRAN, may employ the concept of self organizing network. Conventional methods of network planning and tuning are based on manual interaction, which consumes enormous amounts of time and resources and requires considerable involvement of work force.

It is in general very attractive to have reliable schemes and mechanisms that provide for automatic configuration and re-configuration of a network whenever it is necessary. This is particularly true in the light of network complexity, the large number of system parameters in most networks, the growing number of IRATs (inter radio access technologies) that it is desirable to support in a network, etc.

This can be realized by SON. The objective of the SON functionality is to provide for automatic network planning, tuning of network parameters, and configuring of the network nodes. SON may be seen as a set of algorithms and protocols performing the task of automatic network tuning and configuration. To perform the appropriate operations, a SON node requires measurement reports and/or results from other nodes (e.g. terminal, base station, etc.). SON may also be used for automatically changing the operational mode of cells (from "active" state to "idle" state and vice versa).

When a terminal is located in a wireless communication system where at least one network node may be in one of two operational modes as described above, it may be an advantage for the terminal to know the current operational mode of the network node (for example to be able to perform any of the above example tasks as accurately and resource efficiently as possible).

Hence, there is a need for methods and apparatuses that enable a terminal to determine the current operational mode of a network node.

According to embodiments of the invention, a terminal may blindly detect a current operational mode of a network node. Thus, the terminal may detect the current operational mode of the network node autonomously, without any intervention from the network.

The gained knowledge regarding the current operational mode of the network node may be used to adapt further operations of the terminal. For example, if the current operational mode of the network node is an energy saving mode ("idle" state) the terminal may use synchronization signals (e.g. PSS/SSS) for one or more of: RLM, mobility measurements (e.g. signal strength/quality measurements for handover and/or cell re-selection), positioning related measurements (e.g. time difference of arrival of signals from different cells), time tracking, frequency tracking (e.g. automatic frequency control (AFC)), mobile speed detection, and Doppler estimation. On the other hand, if the current operational mode of the network node is a normal operation mode ("active" state) the terminal may use reference symbols (e.g. pilot symbols) for one or more of these purposes. In some embodiments, the gained knowledge may be used to adapt a time pattern based on the current downlink transmission mode, wherein the time pattern specifies when a receiver of the terminal is turned on (e.g. in discontinuous reception, DTX, mode of the terminal).

One example way of achieving the blind detection of the current operational mode of a network node is to correlate a known signal pattern with a signal received from the network node and comparing correlation values with a particular correlation threshold. If a correlation value exceeds the threshold, it may be determined that the network node is in a particular operational mode (e.g. a normal operational mode), and if no correlation value exceeds the threshold, it may be determined that the network node is in another operational mode (e.g. an energy saving operational mode). The known signal pattern may be defined by the cell identity and may comprise a signal that is only transmitted if the network node is in its normal operational mode (e.g. reference symbols). It may also be known (for the cell identity) at what time and/or frequency positions the signal pattern is present and other parameters (e.g. a scrambling code used), and this knowledge may be used to perform the correlation correctly and to select which correlation values need to be compared to the correlation threshold.

In the example of correlation with a reference signal, there may be variants of energy saving modes that do transmit the reference signal but only to a limited extent (e.g. at certain time and/or frequency positions). In such situations, the correlation may be performed for positions where the reference symbols are not transmitted for the energy saving mode.

Another example way of achieving the blind detection of the current operational mode of a network node is to attempt to decode some specific broadcast information of a received signal. If the decoding attempt is successful it may be determined that the network node is in a particular operational mode (e.g. a normal operational mode), and if the decoding attempt is not successful, it may be determined that the network node is in another operational mode (e.g. an energy saving operational mode). The specific broadcast information may comprise a signal that is only transmitted if the network node is in its normal operational mode (e.g. a PBCH—Physical Broadcast CHannel—signal).

In some embodiments (in particular for SON applications), the terminal may receive a request from the network to detect the current operational mode of a network node and report the result (and possibly the corresponding cell identifier) to the network. For example, a report may be directed to a network node and comprise detected states of the cells of that network node.

In some embodiments, there is no particular request sent from the network to the terminal, but the terminal is required to detect the current operational mode of a network node and report the result to the network at certain time intervals and/or under certain conditions. For example, the terminal may be required to report a detected change in operational mode of a network node.

According to some embodiments, there may be several definitions of the "idle" state of a network node specified. For example, there may be several ways of organizing transmitted signals/channels to save energy. In such embodiments, a terminal may be able to also blindly detect the current "idle" state type using methods similar to those described above.

One example way of achieving this type of blind detection may be to correlate a known signal pattern with a signal received from the network node and comparing correlation values with a particular correlation threshold as described above. The known signal pattern may, for example, comprise a signal that is transmitted at a certain set positions if the network node is in its normal operational mode, at another set of positions if the network node is in its first energy saving mode and not at all if the network node is in its second energy saving mode. Comparing selected correlations values (based on the certain sets of positions) to the threshold may result in a decision regarding the current operational mode of the network node.

Thus, according to embodiments of the invention, the terminal is able to determine the operational mode (normal operation mode or energy saving mode) of a network node. It is to be noted that embodiments of the invention enables the terminal to detect the current operational mode of one or more camping/serving cells, but also allows the terminal to detect the current operational mode of neighboring cells (i.e. non-camping/serving cells).

The terminal may adapt its operation based on the detected mode of a network node (serving/camping or neighboring). This adaptation may improve the terminal behavior (e.g. in terms of robustness, performance and/or power consumption).

FIG. 1A illustrates an example method 100 that may be performed by a terminal according to some embodiments of the invention. In step 110, the terminal detects a new cell. Typically, a cell is detected using cell search procedures well known in the art. The detection of a cell typically involves acquiring an identifier (cell ID) for the cell.

In step 120, the terminal detects the current operational mode of the cell. The detection may comprise detecting an actual operational mode and/or detecting a change in operational mode.

In step 130, the terminal adapts at least some of its processing based on the knowledge gained in step 120 as has been exemplified above.

The terminal may store the current operational mode of one or more of the detected cells. For example, the terminal may store the current mode of all camping/serving cells. Furthermore, the terminal may store the current mode of all cells in a list of monitored cells.

FIG. 1B illustrates a first example sub-method that may be performed as part of method step 120 of FIG. 1A.

A signal received from the network node under consideration is correlated to a known signal in step 121. The correlation may be performed over a certain duration of time to ensure reliable results.

One or more values resulting from the correlation are compared to a threshold value in step 123. The correlation values to compare may be chosen based on known positions of the known signal. If several values are considered for the comparison, the criterion may be that at least one, all, or another certain number of the correlation values should exceed the threshold, or that a function of the correlation values (e.g. a sum or an average value) should exceed the threshold.

Based on the comparison of step 123, it is determined whether the network node is in its normal operational mode (step 125) or in an energy saving mode (step 124).

FIG. 1C illustrates a second example sub-method that may be performed as part of method step 120 of FIG. 1A.

In step 126, an attempt is made to decode a particular signal. Presumably in this scenario, if the signal is actually received (i.e. if it is transmitted by the network node) it is also in general possible to decode it. Thus, in step 127, it is evaluated whether it was possible to decode the signal or not. If the decoding was successful it is determined that the network node is in its normal operational mode (step 129), and if the decoding was not successful (e.g. if the BLER—BLock Error Rate—of the decoding was above some threshold) it is determined that the signal was not even transmitted from the network node and hence that the network node is in its energy saving mode (step 128).

FIG. 1D illustrates an example sub-method that may be performed as part of method step 130 of FIG. 1A.

The information regarding current operational mode of a camping/serving cell may be used in the following way (using UMTS LTE as an example).

If the mode is a normal operation mode (NO-path out of step 131), the terminal may use reference signals (in step 133) of all sub-frames for radio link monitoring (RLM), and/or for keeping frequency and/or time synchronized with the cell (e.g. AFC). In step 133, the terminal may also or alternatively use reference signals of all sub-frames for mobility measurements (RSRP/RSRQ) to be used for cell reselection and/or handover. Such measurements may be done on a regular basis on both camping/serving cells as well as on detected neighboring cells (e.g. monitored cells).

If the mode is an energy saving operation mode (YES-path out of step 131), the terminal may have to rely (in step 132) on only synchronization signals (PSS and/or SSS) for Radio Link Monitoring (RLM), and/or keeping frequency and/or time synchronized with the cell (e.g. AFC). In step 132, the terminal may also or alternatively use synchronization signals for mobility measurements (RSRP/RSRQ) to be used for cell reselection and/or handover.

FIG. 2 illustrates an example method 200 that may be performed by a terminal according to some embodiments of the invention. In step 210, the terminal detects a new cell as elaborated on above in connection to method step 110 of FIG. 1A.

In optional step 215, the terminal may receive a request from the network to detect and report current operational mode of one or more network nodes. As elaborated on earlier, the terminal may alternatively (or additionally) be configured to transmit such reports at regular time intervals or under certain conditions (e.g. a detected change in operational mode).

In step 220, the terminal detects the current operational mode of those network nodes, for example by using any of the methods described above. If the mode of a network node under consideration is already known (e.g. via earlier performed and stored detection), step 220 may simply be bypassed for this network node.

In step 230, the terminal transmits a report to the network based on the result of step 220. The report may, for example, comprise the detected operational mode(s) and corresponding cell identification(s). Alternatively, the report may comprise only the cell identities of the cell that are in energy saving mode. In some embodiments, the network may configure the terminal to send reports provided that more than a certain number of detected cells are in energy saving mode. In some embodiments, the terminal may additionally report the time periods during which the different cells remained in energy saving mode.

The network may specify that the terminal is to report the state of the cells observed over certain time. If, in such a scenario, a serving cell goes into energy saving mode some time after having sent a request to the terminal (e.g. as in step 215), then the terminal may have to postpone transmission of its report concerning the modes of neighboring cells until the serving cell becomes active again. To avoid this inconvenience, a cell that has requested terminals to send mode reports may be configured to wait for a minimum time period before going into an energy saving mode. This minimum time period may be signaled to the terminal to indicate that it should send the report before this period has lapsed. The time periods may be pre-defined in the standard (e.g. in the form of performance requirements).

One objective of reports, such as those described in the examples above, may be for the network to collect statistics of the modes of different cells in the network. There may be various ways to put such statistic to use, and a few examples are given in the following.

The obtained statistics may be used by a network node such as an operation and maintenance node (O&M or OSS) or by a self optimized network node (SON). The statistics may be used for various purposes such as for network planning, network performance observability, etc (especially in relation to the energy saving).

The obtained statistics may also or alternatively be used for network nodes to be able to semi-statically change the mode of the cells in the coverage area to maintain adequate overall system performance (e.g. acceptable call dropping, handover performance, etc.). For instance, the number of "idle" neighboring cells (of a serving cell) may be kept below a threshold (the threshold being an absolute value or a relative value). Hence, in such an approach, if a terminal reports that more cells are in "idle" state over a certain time period than is allowed by the threshold, then the network node can take appropriate action. For example, the network node may activate some of the neighboring cells via signaling (e.g. signaling over X2 interface between the eNodeB in UMTS LTE or over Iub interface between RNC and NodeB in UTRAN).

In order to reduce signaling overhead, the network (or the serving cell) may typically request reporting from a sub-set of terminals and at a selected time.

FIG. 3 is a schematic drawing illustrating a computer readable medium in the form of a CD-ROM 300 according to some embodiments of the invention. The CD-ROM 300 may have stored thereon a computer program comprising program instructions. The computer program may be loadable (as shown by arrow 310) into an electronic device 320 comprising a processing unit 340 and possibly a separate memory unit 330. When loaded into the electronic device 320, the computer program may be stored in the memory unit 330. According to some embodiments, the computer program may, when loaded into the electronic device 320 and run by the processing unit 340, cause the electronic device 320 to execute method steps according to, for example, any of the methods shown in any of the FIGS. 1A-D and 2. The electronic device 320 may, for example be a communication device or a component of a communication device, wherein the communication device is a portable or handheld mobile radio communication equipment, a mobile radio terminal, a mobile telephone, a communicator, an electronic organizer, a smartphone, a computer, a notebook, or a mobile gaming device.

FIG. 4A illustrates an example arrangement 400 according to some embodiments of the invention.

The arrangement 400 comprises a cell identifier 440, which may, for example, be adapted to perform method steps as step 110 and/or 210 described in connection with FIGS. 1A and 2 respectively.

The arrangement 400 also comprises an operational mode detector 450, which may, for example, be adapted to perform method steps as step 120 and/or 220 described in connection with FIGS. 1A and 2 respectively.

Furthermore, the arrangement 400 comprises a controller 460, which may, for example, be adapted to perform method steps as step 130 and/or 230 described in connection with FIGS. 1A and 2 respectively.

The cell identifier 440 and the operational mode detector 450 are arranged to receive signals from a receiver 420, which in turn is connected to one or more antennas 410. The cell identifier 440 is arranged to supply information relating to the cell identity (e.g. reference signal pattern, scrambling codes, etc) to the operational mode detector 450. The operational mode detector 450 is arranged to forward a detected current operational mode to the controller (CU) 460.

The controller 460 may be arranged to cause a transmitter 430 (which is in turn connected to one or more antennas 410) to transmit mode reports to a network as described, for example, for step 230 of FIG. 2.

Alternatively or additionally, the controller 460 may be arranged to store the detected operational mode in a memory (not shown) and/or to adapt any further processing 470 (e.g. of the received signal) based on the operational mode. The adaptation may, for example, be according to what has been described in connection to step 130 of FIG. 1A.

FIG. 4B illustrates an example operational mode detector 450B comprising a correlator 451, a comparator 452, and determination circuitry 453, which may, for example, be adapted to perform method steps as described in connection to FIG. 1B.

FIG. 4C illustrates an example operational mode detector 450C comprising a decoder 455, and determination circuitry 456, which may, for example, be adapted to perform method steps as described in connection to FIG. 1C.

In some embodiments, functional blocks that already exist in the further processing block 470 may be re-used in the arrangement 400. This may, for example, apply to the controller 460, the decoder 455, the correlator 451, and/or the cell identifier 440.

FIG. 5 illustrates an example mobile terminal 500, illustrated as a mobile telephone in a schematic front view.

The example mobile terminal 500 is adapted to connect to a mobile telecommunication network via a wireless link to a radio base station. The mobile terminal may, for example, comprise an arrangement as described in connection to FIGS. 4A-C and/or perform any of the methods as described in connection to FIGS. 1A-D and 2.

The described embodiments of the invention and their equivalents may be realised in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may, for example, be a portable or handheld mobile radio communication equipment, a mobile radio terminal, a mobile telephone, a communicator, an electronic organizer, a smartphone, a computer, a notebook, or a mobile gaming device.

According to some embodiments of the invention, a computer program product comprises a computer readable medium such as, for example, a diskette, a USB-stick or a CD-ROM (compare with FIG. 3). The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in any of the FIGS. 1A-D and 2.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method of operating a terminal of a wireless communication network, wherein the wireless communication network comprises one or more wireless network nodes having at least first and second downlink transmission modes,
the first downlink transmission mode comprising normal operation of a particular network node and being applicable when a number of active terminals in a cell associated with the particular network node is greater than a first mode threshold value,
the second downlink transmission mode comprising restricted downlink transmission of the particular network node and being applicable when the number of active terminals in the cell associated with the particular network node is less than or equal to a second mode threshold value, the restricted downlink transmission comprising information that assists active terminals not served by the cell in finding the cell and/or non-active terminals camping on the cell to stay in synchronization with the wireless communication network, comprising:
detecting a cell identity for a cell associated with a wireless network node of the wireless communication system;
detecting a current downlink transmission mode of the wireless network node as the first or second downlink transmission mode; and
adapting a further operation of the terminal based on the detected current downlink transmission mode,
wherein the step of detecting a current downlink transmission mode comprises using blind detection of the current downlink transmission mode, and
wherein the blind detection of the current downlink transmission mode comprises:
correlating a received signal with a specific signal pattern that is transmitted by the wireless network node only when the wireless network node is operating in the first downlink transmission mode; and
determining whether the wireless network node operates in first or second downlink transmission mode based on the correlation step.

2. The method of claim 1, wherein the step of determining whether the wireless network node operates in the first or second downlink transmission mode based on the correlation step comprises:
comparing a mode determination value with a correlation threshold value, wherein the mode determination value is based on one or more correlation values of the correlation step;
determining that the wireless network node operates in the first downlink transmission mode if the mode determination value exceeds the correlation threshold value; and
determining that the wireless network node operates in the second downlink transmission mode if the mode determination value does not exceed the correlation threshold value.

3. The method of claim 1, further comprising:
receiving a request from the wireless communication network to detect the current downlink transmission mode and report the detected current downlink transmission mode to the network node; and
reporting the detected current downlink transmission mode to the network node.

4. The method of claim 1, wherein the second operation mode comprises transmission of a synchronization signal and wherein the step of adapting the further operation of the terminal based on the detected current downlink transmission mode comprises:
if the current downlink transmission mode is the second downlink transmission mode, using the synchronization signal for at least one of:
monitoring a quality of a downlink radio link;
automatic frequency control;
mobility measurements;
positioning measurements for determination of terminal location;
time synchronization; and
frequency synchronization.

5. The method of claim 1, wherein the second operation mode comprises intermittent downlink transmission of the particular network node.

6. The method of claim 1, wherein at least one of the first and second mode threshold values equals zero.

7. A method of operating a terminal of a wireless communication network, wherein the wireless communication network comprises one or more wireless network nodes having at least first and second downlink transmission modes,
the first downlink transmission mode comprising normal operation of a particular network node and being applicable when a number of active terminals in a cell associated with the particular network node is greater than a first mode threshold value, the second downlink transmission mode comprising restricted downlink transmission of the particular network node and being applicable when the number of active terminals in the cell associated with the particular network node is less than or equal to a second mode threshold value, the restricted downlink transmission comprising information that assists active terminals not served by the cell in finding the cell and/or non-active terminals camping on the cell to stay in synchronization with the wireless communication network, comprising:

detecting a cell identity for a cell associated with a wireless network node of the wireless communication system;

detecting a current downlink transmission mode of the wireless network node as the first or second downlink transmission mode; and adapting a further operation of the terminal based on the detected current downlink transmission mode, wherein the step of detecting a current downlink transmission mode comprises using blind detection of the current downlink transmission mode, and wherein the blind detection of the current downlink transmission mode comprises:

making an attempt to decode specific broadcast information of a received signal, wherein the specific broadcast information is transmitted by the wireless network node only when the wireless network node is operating in the first downlink transmission mode;

determining that the wireless network node operates in the first downlink transmission mode if the attempt is successful; and determining that the wireless network node operates in the second downlink transmission mode if the attempt is not successful.

8. The method of claim 7, further comprising:

receiving a request from the wireless communication network to detect the current downlink transmission mode and report the detected current downlink transmission mode to the network node; and reporting the detected current downlink transmission mode to the network node.

9. The method of claim 7, wherein the second operation mode comprises transmission of a synchronization signal and wherein the step of adapting the further operation of the terminal based on the detected current downlink transmission mode comprises:

if the current downlink transmission mode is the second downlink transmission mode, using the synchronization signal for at least one of:

monitoring a quality of a downlink radio link;

automatic frequency control;

mobility measurements;

positioning measurements for determination of terminal location;

time synchronization; and frequency synchronization.

10. The method of claim 7, wherein the second operation mode comprises intermittent downlink transmission of the particular network node.

11. The method of claim 7, wherein at least one of the first and second mode threshold values equals zero.

12. A computer program product comprising a nontransitory computer readable medium, having thereon a computer program comprising program instructions, the computer program being loadable into a data-processing unit of a terminal of a wireless communication network, wherein the wireless communication network comprises one or more wireless network nodes having at least first and second downlink transmission modes, the first downlink transmission mode comprising normal operation of a particular network node and being applicable when a number of active terminals in a cell associated with the particular network node is greater than a first mode threshold value, the second downlink transmission mode comprising restricted downlink transmission of the particular network node and being applicable when the number of active terminals in the cell associated with the particular network node is less than or equal to an active terminals threshold value, the restricted downlink transmission comprising information that assists active terminals not served by the cell in finding the cell and/or non-active terminals camping on the cell to stay in synchronization with the wireless communication network, the computer program being adapted to cause the data-processing unit to execute at least the following steps when the computer program is run by the data-processing unit:

detecting a cell identity for a cell associated with a wireless network node of the wireless communication system;

detecting a current downlink transmission mode of the wireless network node as the first or second downlink transmission mode; and adapting a further operation of the terminal based on the detected current downlink transmission mode, wherein the step of detecting a current downlink transmission mode comprises using blind detection of the current downlink transmission mode, and wherein the blind detection of the current downlink transmission mode comprises:

correlating a received signal with a specific signal pattern that is transmitted by the wireless network node only when the wireless network node is operating in the first downlink transmission mode; and determining whether the wireless network node operates in first or second downlink transmission mode based on the correlation step.

13. An arrangement for a terminal of a wireless communication network, wherein the wireless communication network comprises one or more wireless network nodes having at least first and second downlink transmission modes, the first downlink transmission mode comprising normal operation of a particular network node and being applicable when a number of active terminal in a cell associated with the particular network node is greater than a first mode threshold value, the second downlink transmission mode comprising restricted downlink transmission of the particular network node and being applicable when the number of active terminals in the cell associated with the particular network node is less than or equal to an active terminals threshold value, the restricted downlink transmission comprising information that assists active terminals not served by the cell in finding the cell and/or non-active terminals camping on the cell to stay in synchronization with the wireless communication network, comprising:

a cell identity detector arranged to detect a cell identity for a cell associated with a wireless network node of the wireless communication system;

a transmission mode detector arranged to detect a current downlink transmission mode of the wireless network node as the first or second downlink transmission mode; and a controller arranged to adapt a further operation of the terminal based on the detected current downlink transmission mode, wherein the transmission mode detector comprises:

a correlator arranged to correlate a received signal with a specific signal pattern that is transmitted by the wireless network node only when the wireless network node is operating in the first downlink transmission mode;

a comparator arranged to compare a mode determination value with a correlation threshold value, wherein the mode determination value is based on one or more correlation values of the correlation step; and determination circuitry arranged to determine that the wireless network node operates in the first downlink transmission mode if the mode determination value exceeds the correlation threshold value and that the wireless network node operates in the second downlink transmission mode if the mode determination value does not exceed the correlation threshold value.

14. The arrangement of claim 13, further comprising:

a receiver arranged to receive a request from the wireless communication network to detect the current downlink transmission mode and report the detected current downlink transmission mode to the network node; and a transmitter adapted to transmit a report comprising the detected current downlink transmission mode to the network node.

15. A communication device comprising the arrangement according to claim 13.

16. An arrangement for a terminal of a wireless communication network, wherein the wireless communication network comprises one or more wireless network nodes having at least first and second downlink transmission modes, the first downlink transmission mode comprising normal operation of a particular network node and being applicable when a number of active terminal in a cell associated with the particular network node is greater than a first mode threshold value, the second downlink transmission mode comprising restricted downlink transmission of the particular network node and being applicable when the number of active terminals in the cell associated with the particular network node is less than or equal to an active terminals threshold value, the restricted downlink transmission comprising information that assists active terminals not served by the cell in finding the cell and/or non-active terminals camping on the cell to stay in synchronization with the wireless communication network, comprising:

a cell identity detector arranged to detect a cell identity for a cell associated with a wireless network node of the wireless communication system;

a transmission mode detector arranged to detect a current downlink transmission mode of the wireless network node as the first or second downlink transmission mode; and a controller arranged to adapt a further operation of the terminal based on the detected current downlink transmission mode, wherein the transmission mode detector comprises:

a decoder arranged to make an attempt to decode specific broadcast information of a received signal, wherein the specific broadcast information is transmitted by the wireless network node only when the wireless network node is operating in the first downlink transmission mode; and determination circuitry arranged to determine that the wireless network node operates in the first downlink transmission mode if the attempt is successful and that the wireless network node operates in the second downlink transmission mode if the attempt is not successful.

17. A communication device comprising the arrangement according to claim 16.

* * * * *